United States Patent [19]

Gräff

[11] Patent Number: 5,199,964
[45] Date of Patent: Apr. 6, 1993

[54] METHOD AND APPARATUS FOR ADSORBING MOISTURE FROM GASES ESPECIALLY AIR

[76] Inventor: Roderich Gräff, 607 Church St., Ann Arbor, Mich. 48104

[21] Appl. No.: 864,600

[22] Filed: Apr. 7, 1992

Related U.S. Application Data

[63] Continuation-in-part of Ser. No. 678,885, Mar. 27, 1991, abandoned, which is a continuation of Ser. No. 468,228, Jan. 22, 1990, abandoned.

[30] Foreign Application Priority Data

| Jan. 21, 1989 | [DE] | Fed. Rep. of Germany | 3901779 |
| Jan. 18, 1990 | [EP] | European Pat. Off. | 90101002.5 |
| Jan. 22, 1990 | [BR] | Brazil | PI9000240 |
| Jan. 22, 1990 | [JP] | Japan | 2-013455 |
| Feb. 5, 1990 | [IN] | India | 108/CAL/90 |

[51] Int. Cl.$^5$ ............................................. B01D 53/04
[52] U.S. Cl. ............................................. 55/20; 55/21; 55/33; 55/163; 55/179
[58] Field of Search ............ 55/20, 21, 33, 179, 55/163, 220, 389; 34/80

[56] References Cited

U.S. PATENT DOCUMENTS

| 3,257,777 | 6/1966 | Maddox et al. | 55/20 |
| 3,448,561 | 6/1969 | Seibert et al. | 55/20 |
| 3,621,585 | 1/1971 | Robertson | 34/80 X |
| 4,197,095 | 4/1980 | White | 55/20 |
| 4,413,426 | 11/1983 | Graff | 34/80 X |
| 4,504,286 | 3/1985 | Carlisle et al. | 55/20 |
| 4,718,020 | 1/1988 | Duich et al. | 55/163 X |
| 4,832,711 | 5/1989 | Christel et al. | 55/20 |
| 4,941,894 | 7/1990 | Black | 55/20 |

*Primary Examiner*—Charles Hart
*Attorney, Agent, or Firm*—Michael J. Striker

[57] ABSTRACT

The method of controlling a duration of an adsorption cycle is used in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles. This method consists of monitoring, during a regeneration cycle, a parameter of the adsorbing material depending on a total amount of moisture adsorbed by the adsorbing material during an adsorption cycle immediately preceding the regeneration cycle; comparing the value of the parameter monitored to a predetermined value of the parameter related to an optimum quantity of moisture to be adsorbed by the adsorbing material during adsorption; and controlling the duration of an adsorption cycle immediately following the regeneration cycle according to the comparing. The monitored parameter can be the temperature of the adsorbing material or the temperature of the regenerating medium measured after passing through the adsorbing material.

18 Claims, 4 Drawing Sheets

METHOD AND APPARATUS FOR ADSORBING MOISTURE FROM GASES ESPECIALLY AIR

This application is a continuation-in-part of application Ser. No. 678,885, filed Mar. 27, 1991, now abandoned which in turn is a continuation of application Ser. No. 468,228, filed Jan. 22, 1990, now abandoned.

BACKGROUND OF THE INVENTION

The present invention relates to a process and apparatus for adsorbing moisture from gases, particularly air, and, more particularly, to a method of controlling a duration of an adsorption cycle in the process for adsorbing moisture from gases.

German Published Patent Application 36 25 013 discloses utilization of dried air for drying bulk material, particularly plastic granulates. The dried air is fed through the bulk material dropping through a drying container under gravity in a reverse flow. The moisture carried with the exhaust air from the drying container is removed from the exhaust air by a moisture-adsorbing material. After a fixed time period the moisture-adsorbing material with this moisture is separated and is regenerated by a hot regeneration medium, mostly hot air, during a regeneration cycle.

Usually the duration of adsorption is determined according to the maximum load of moisture which the adsorbing material, mostly molecular sieve, may hold. The greatest possible quantity of moisture from the gas to be dried should be adsorbed during the adsorption period, and the dried air again supplied to the drying container should have a low dew point.

When the drying container is run with maximum throughput through the bulk material to be dried, the exhaust air drying apparatus explained above operates with high efficiency. However, in case the moisture load of the exhaust air decreases, e.g. because the throughput through the drying container is reduced or because the bulk material contains less moisture, the adsorbing material within a drying pot is regenerated after a fixedly set adsorption period although the maximum moisture adsorption capacity of the adsorbing material is not reached.

To improve the energy balance in such cases the dew point of the dried air flowing out from the drying pot and being supplied to the drying container is monitored continuously for extending the adsorption period of the drying pot until the dew point approaches a tolerable limit value. Only when the limit value of the dew point is reached will the drying pot be switched to regeneration.

However, some expenses are involved in providing a dew point sensor of sufficient load tolerances. Moreover the dew point sensors are often subject to failures. Such metering sensors degrade easily and become contaminated already after a short lifetime and emit then inexact signals which prevent full utilization of the moisture adsorbing capacity of the adsorption material. Moreover, the exhaust air may assume high temperatures of approximately 60° through 80° C. when the throughput through the drying container is reduced. At these high temperatures, a molecular sieve no longer can adsorb moisture effectively. Therefore, in case of reduced moisture load of the exhaust air a bad dew point is signalled, although the moisture adsorbing capacity of the molecular sieve is not fully utilized.

For determining the optimum length of the adsorption period U.S. Pat. No. 2,561,441 recommends scanning the temperatures of the air to be dried at the input into the adsorbing material and at the output from the adsorbing the adsorbing material during the adsorption period. A temperature difference is formed from the input temperature and the output temperature which indicates the actually adsorbed moisture at any moment.

When the temperature difference decreases to a preset minimum temperature difference, the drying pot including the adsorbing material is switched to the regeneration phase. This method for switching from the adsorption period to the regeneration period operates as desired only if the moisture content of the input air remains constant in time. However, for a number of granulate drying processes the moisture content of the input air varies. Consequently, when the moisture content of the input air decreases, also the temperature difference decreases. Thereby, an erroneous indication of the saturation of the adsorbing material is obtained to the effect, that the drying pot is switched to the regeneration period although the adsorbing material is not completely utilized.

SUMMARY OF THE INVENTION

It is therefore an object of the present invention to provide an improved method for drying humid air which allows optimizing the length of the moisture adsorbing period by utilizing simple scanning methods, even if the input moisture varies, to obtain an optimum length of adsorption period.

The invention provides a method of controlling the length of an adsorption cycle in a process for adsorbing moisture from a gas, particularly air, using an adsorbing material comprising the steps of passing a moisture-carrying gas and a heated regenerating medium alternatingly through the adsorbing material in a series of alternating adsorption cycles and regeneration cycles. The method consists of monitoring during a regeneration cycle a parameter of the adsorbing material depending on the quantity of moisture adsorbed by the adsorbing material during an adsorption cycle immediately preceding the regeneration cycle; comparing the monitored parameter to a predetermined parameter related to the optimum quantity of moisture to be adsorbed by the adsorbing material during an adsorption cycle; and controlling the duration of the adsorption cycle immediately following the monitored regeneration cycle according to the result of the comparison.

According to one embodiment a method of controlling the length of an adsorption cycle is provided in a process for adsorbing moisture from a gas, particularly air, by an adsorbing material comprising the steps of passing a moisture-carrying gas and a heated regenerating medium alternatingly through the adsorbing material in a series of alternating adsorption cycles and regeneration cycles. The method consists of monitoring only a temperature of the adsorbing material during a regeneration cycle and determining the period of time which is needed for the temperature of the adsorbing material to increase to a preset temperature from an initial temperature, comparing this time interval to a predetermined time interval and controlling the duration of the adsorption cycle immediately succeeding the regeneration cycle according to the result of the comparison. In yet another embodiment the invention provides a method of controlling the length of an adsorption cycle in a process for adsorbing moisture from a gas, particularly air, by an adsorbing material comprising the steps of passing a moisture-carrying gas and a heated regenerating medium alternatingly through the adsorbing material in a series of alternating adsorption cycles and regeneration cycles. The method of controlling the length of the adsorption cycle consists of monitoring only the temperature of the regenerating medium leaving the adsorbing material during a regeneration cycle and determining a time interval which is required for the temperature of the regenerating medium to increase to a predetermined temperature from an initial temperature, comparing this period of time to a predetermined time interval and controlling the duration of the adsorption cycle immediately following the regeneration cycle by the result of the comparison.

In still another embodiment a method for controlling the length of an adsorption cycle is provided in a process for adsorbing moisture from a gas, particularly air, by an adsorbing material. The process for adsorbing moisture comprises the steps of passing a moisture-carrying gas and a heated regenerating medium alternatingly through the adsorbing material in a series of alternating adsorption cycles and regeneration cycles. This method for controlling the length of an adsorption cycle consists in the steps of monitoring, during an adsorption cycle, the dew point of the dried gas and comparing the monitored dew point of the dried gas to a preset or predetermined dew point; controlling the duration of the following adsorption cycle by the result of that comparison; and allowing the dew point to rise or fall in response to a rising or falling temperature of the moisture-carrying gas.

The invention provides a process for adsorbing moisture from gases, particularly air, by means of an adsorbing material. Gas to be dried and a regenerating medium having elevated temperatures are fed alternatingly through the adsorbing material. The length in time of the adsorption period is controlled by measuring temperatures of the adsorbing material of the regenerating medium during the regeneration period. The measured temperatures are utilized for varying the duration of the succeeding adsorption periods to obtain an improved duration of the subsequent adsorption periods.

It is the specific advantage of the invention to utilize only one simple temperature measurement for optimizing the length of the adsorption of the adsorption cycle. The invention is based on the fact that during the regeneration cycle the temperature change of the adsorbing material and/or the regenerating medium leaving the adsorbing material over time is very much dependent on the water content of the adsorbing material prior to the beginning of the regeneration cycle.

Figure 1:
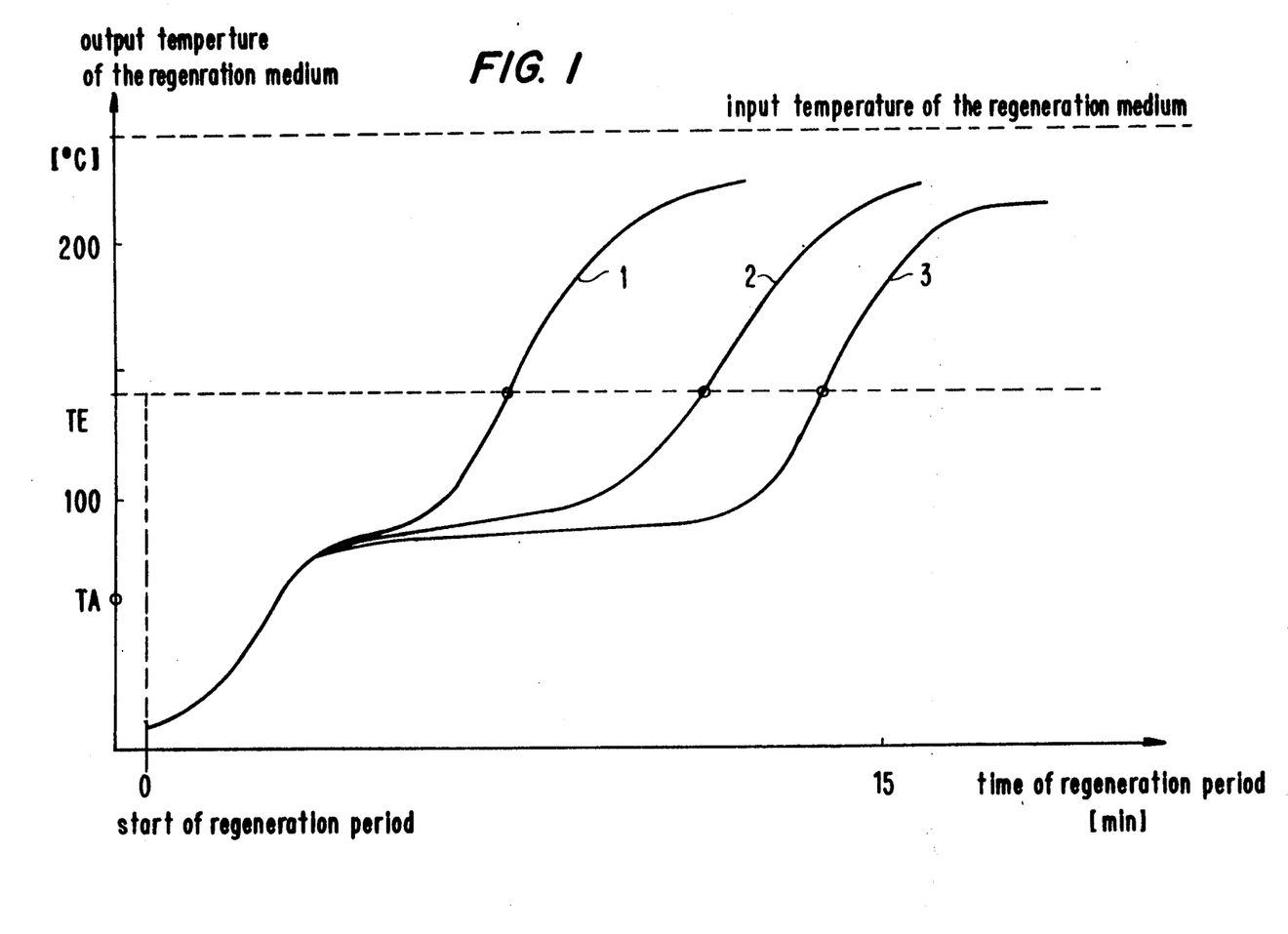
FIG. 1 is a graphical illustration of the relationship between effluent regenerating medium temperature versus time during regeneration for specific water loads.

If the temperature of the regenerating medium or the temperature of the adsorbing material during a regeneration period is measured over time a graph is obtained according to the enclosed FIG. 1 for different water loads of the adsorbing material. For example curve 2 shows a change of the temperature of the regenerating material during regeneration for a medium water load of the adsorbing material, curve 3 shows it for a greater waterload and curve 1 shows it for a lower waterload.

At the beginning of the regeneration period the temperature rises fast and continues into a more moderate increase over a temperature range within which the water is evaporated substantially from the adsorbing material. This temperature range depends from the type of the utilized adsorbing material. For molecular sieve the temperature range extends from approximately 80 degree centigrade to 100 degree centigrade. When the water is substantially removed from the adsorbing material, the temperature rises faster for finally approaching the input temperature of the regenerating medium, i.e. hot air.

If the temperature of the regenerating medium is continueously scanned by a temperature sensor, the time period from the beginning of the regeneration until a predetermined temperature TE selected from the range of the final fast raise of the temperature represents an indication of the waterload of the adsorbing material. The dependency of the time period on the water load may be determined empirically. Thus, the period in time from the beginning of the regeneration period until the temperature TE of the regenerating medium is reached may be utilized as an indication for the quantity of moisture adsorbed by the adsorbing material.

For controlling the length of the succeeding adsorption period the time period is determined which elapses from the beginning of a regeneration period until temperature TE is reached. Such determined time period is compared to a predetermined value which represents a period in time needed to evaporate an optimum quantity of waterload contained in the adsorbing material at the beginning of a regeneration period. If the determined period in time falls below that predetermined value, indicating a smaller adsorbed water load, the succeeding adsorption period is extended, and if the determined period exceeds that predetermined value, indicating a greater water load, the succeeding adsorption period is shortened. The temperature TE is chosen advantageously in relation the utilized adsorbing material and should be selected somewhat higher than the temperature range within which the water load is removed from the adsorbing material substantially by evaporation. For a molecular sieve the temperature TE could be selected between 120 degree centigrade and 140 degree centigrade.

In drying processes, wherein various exhaust air temperatures may occur, the regeneration starts with various initial temperatures of the molecular sieve. In such cases it is preferred to start the determination of the period in time from a time the regenerating medium has assumed a preset temperature TA. Temperature TA is selected below the zone of temperatures within which the water is substantially removed. For a molecular sieve as adsorbing material TA is selected e.g. at approximately 60 degree centigrade through 80 degree centigrade.

As already described the adsorbing capacity for water of the adsorbing materials is reduced with increasing temperature. For the same high water content of the molecular sieve or silica gel the dried air then has an unfavorable higher dew point. For a number of situations such worsening of the dew point with increasing exhaust air temperature may be accepted because a high exhaust air temperature is a result of a low throughput of plastic material to be dried. The unfavorable dew point then allows still sufficient drying.

In situations, however, wherein the worsening of the dew point of the dried air is not tolerable the length of the adsorption period is according to the invention reduced in relation to the increasing exhaust air temperature. Thereby, the regeneration commences with a lowered adsorbed quantity of water. The optimal length of time for the adsorption cycle may be determined empirically by measuring the temperature of the regenerating medium effluing the adsorbing material or the temperature of the adsorbing material following an adsorption cycle during which the adsorbing material adsorbed the optimum water load. The time span from the beginning of the regeneration cycle until the temperature reaches TE is the desired optical length.

Similar considerations may be applied to a drying process similar to the above for which the length of the adsorption period is controlled depending on the dew point of the dried air. In situations wherein an unfavorable dew point is admissible for increasing exhaust temperature, the admissible dew point which terminates the adsorption cycle is controlled depending on the temperature of the exhaust air. Thus, when the exhaust air temperature rises, the admissible dew point is raised and, when the exhaust temperature decreases, the admissible dew point is lowered.

According to the invention an apparatus is provided for removing moisture from gases, particularly air, which comprises at least one drying pot loaded with adsorbing material. The drying pot is coupled to an exhaust air conduit for humid air, to a dried air conduit for output of dried air, to an input conduit for hot regenerating medium and to an output conduit for used regenerating medium. Specifically, a temperature sensor is mounted in the output conduit of the regenerating medium, the output signal of which is suppled to control means for controlling the length of a succeeding adsorption cycle by sending a switching signal to means for switching from a flow of humid air through the adsorbing medium to a flow of regenerating medium through the adsorbing medium according to a time interval for a predetermined temperature increase of the adsorbing medium during an immediately preceding regeneration cycle. In an alternative embodiment the temperature sensor may extend into the adsorbing material and supplies an output signal to control means for controlling the duration of the succeeding adsorption period according to a time interval for a predetermined temperature increase of the adsorbing medium during an immediately preceding regeneration cycle.

The control means advantageously includes timing means for issuing the switching signals at certain time intervals; memory means for retaining values of the initial temperature, preset temperature, predetermined time interval and the time intervals of adsorption periods; counting means for determining the time intervals and comparison means connected with memory.

DESCRIPTION OF SPECIFIC EMBODIMENTS OF THE INVENTION

Figure 2:
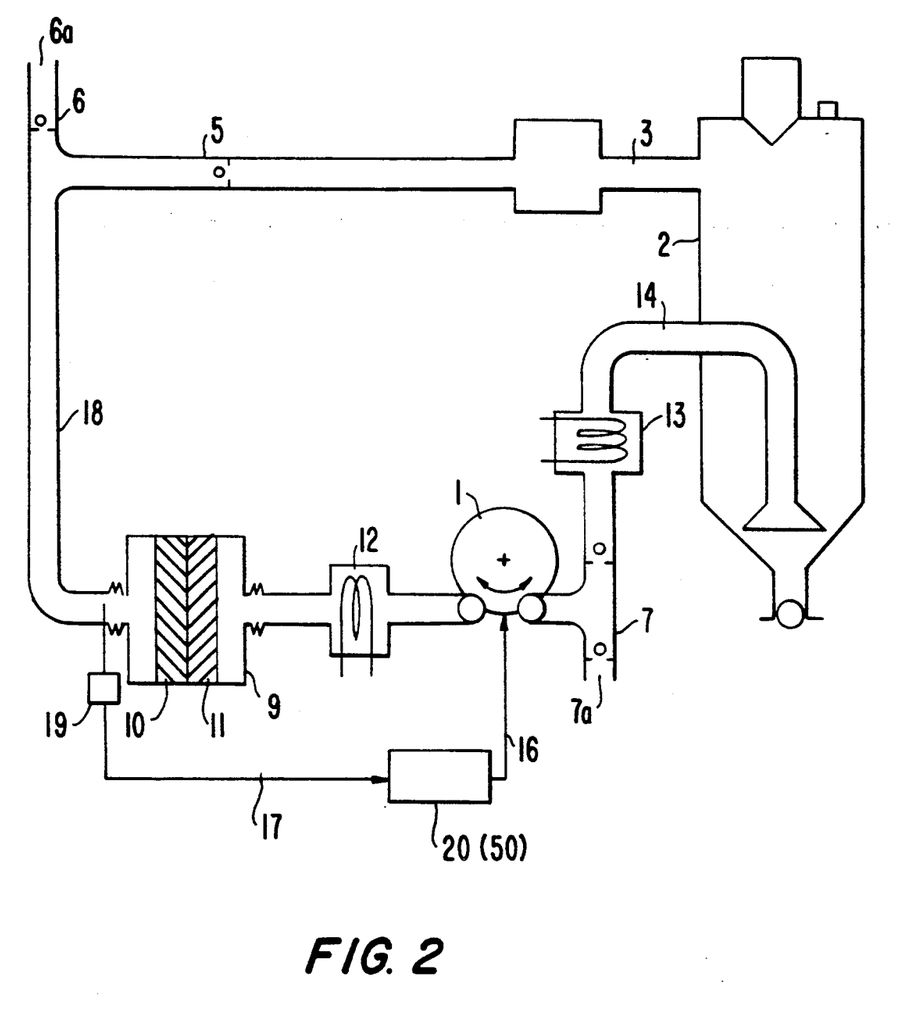
FIG. 2 is a schematic diagram of an apparatus for carrying out the method according to the invention.

For the apparatus schematically shown in FIG. 2 reference is made to the disclosure of German Patent Specification 23 54 745, the details of which are included herein. Dried air is to be fed to a drying hopper 2 through an input conduit 14. The dried air penetrates in reverse flow the not shown bulk material sinking by gravity through the drying hopper 2. Humid air is drawn off from the drying hopper 2 at the upper end thereof through exhaust air conduit 3. The exhaust air conduit 3 opens into a drying pot 9 through a flap valve 5. The drying pot 9 includes adsorbing materials 10, 11 which may be for instance silicagel and molecular sieve. The adsorbing materials 10, 11 remove moisture carried with the humid exhaust air. The dried air flowing out of the drying pot 9 is heated by one or both heating devices 12, 13 and is fed by a blower 1 through another flap valve 8 and through the dried air conduit through the drying hopper 2. When the adsorbing materials 10, 11 are saturated sufficiently by moisture the direction of rotation of the blower 1 is reversed by a control unit 20 so that air from the outside is drawn in through a connecting conduit 7a and another flap valve 7. The air is heated in heating device 12 and is pressed through the drying pot 9. The humid regenerating air is exhausted into the atmosphere through another connecting conduit 6a and a flap valve 6 after the hot regenerating air has taken over adsorbed water out of the adsorbing materials 10, 11. The control unit 20 determines the time when drying the humid exhaust air from the drying hopper 2 is terminated and regeneration of the adsorbing materials 10, 11 is initiated.

Figure 4:
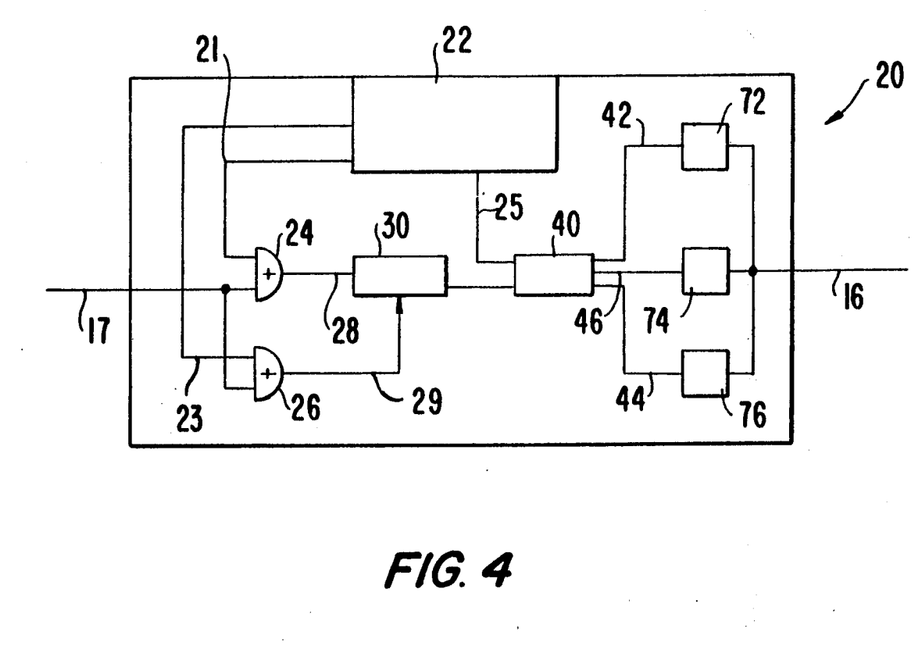
FIG. 4 is a diagram for a control unit to be utilized within the apparatus according to FIGS. 2 or 3.

To this end a temperature sensor 19 is provided, the sensing element of which extends into the output conduit 18 for humid regenerating air from the drying pot 9. The output signal of the temperature sensor 19 is supplied to the control unit 20 through a control signal line 17. The control unit 20 includes a memory 22 for storing signals which correspond to the temperatures TA and TE, respectively. The signal line 17 is connected to one input of a first AND gate 24 and to one input of a second AND gate 26. Output line 28 of AND gate 24 enables a counter 30 to start counting. Output line 29 of AND gate 26 is connected to a stop terminal of the counter 30 for discontinuing further counting thereof. Signal line 21 from memory 22 connects to a second input of AND gate 24 and is adapted to apply a signal corresponding to the temperature TA to gate 24. Thus, when the signal on line 17 corresponds to TA, gate 24 will send an initiating pulse through line 28 to counter 30. Signal line 23 for memory 22 connects to a second input of gate 26 for applying a signal corresponding to TE to gate 26. Therefore, if a signal line 23 transmits a signal corresponding to temperature TE, gate 26 will send an inhibiting signal to counter 30. When counter 30 receives said inhibiting signal, the state of count of the counter is simultaneously transferred to one input of a comparator 40. Signal line 25 from memory 22 connects to a second input of comparator 40 for applying a signal thereto which corresponds to a preset time interval. If the signal received from the counter 30 by the comparator 40 is below the signal on line 25, comparator 40 activates a first timer 72 through output line 42. If the signal from the counter 30 exceeds the signal on line 25, the comparator 30 activates a third timer 76 through line 44. If signal from counter 30 equals signal on line 25 the comparator 40 activates a second timer 74 through line 46.

Each of the timers 72, 74, 76 is adapted to emit when activated a first signal to blower 1 through line 16 for reverting the direction of revolutions thereof which causes switching from the regeneration period to a succeeding adsorption period. Similarly, each of the timers 72, 74, 76 is adapted to emit a second signal to blower 1 through line 16 when the time period for the timer has faded out. That second signal causes again a change of rotations of the blower for switching from an adsorption period to a regeneration period. Importantly, the preset time interval of the first timer 72, i.e. the interval between the first and second signal, is longer, say for 10 minutes, than the corresponding time interval of the second timer 74. Similarly, the time interval of the third timer 76 is shorter, say for 10 minutes, than the corresponding interval of second timer 74.

Thus, the control unit 20 determines the time when the temperature TE within the output conduit 18 is reached and initiates switching of the direction of rotation of the blower 1 through control line 16 which results in switching to moisture adsorption from the humid exhaust air from drying hopper 2.

In an alternative embodiment the sensing element of the temperature sensor 19 is embedded within a portion of the adsorbing material 10 which is proximate to the output conduit 18.

Figure 3:
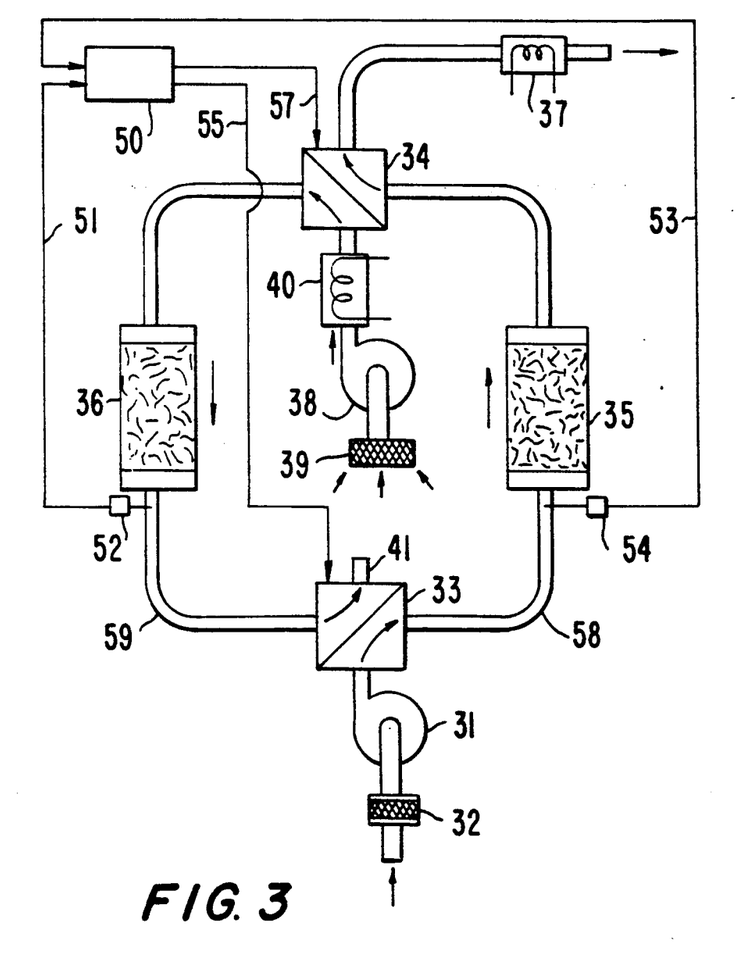
FIG. 3 shows another embodiment of an apparatus for carrying out the invention.

With respect to FIG. 3 reference is made to the disclosure of U.S. Pat. No. 4,038,054 which is incorporated herein. FIG. 3 shows an embodiment of a device for drying humid gas. A blower 31 draws in moisture through a filter 32 and feeds said air through a shuttle valve 33 into a drying pot 35 filled with molecular sieve as adsorbing material. While passing through the adsorbing material within the drying pot 35 moisture carried with the air is removed therefrom. Dried air emanates from drying pot 35 through another shuttle valve 34 and a heating device 37 and returns to a consumer site, for instance a drying hopper.

Simultaneously a blower 38 sucks in regenerating air from the atmosphere through a filter 39 and feeds the regenerating air through a heater 40 for the regenerating air being heated therein. The heated regenerating air is fed through the shuttle valve 34 to a second drying pot 36 which contains molecular sieve as adsorbing material. The heated regenerating air takes over the moisture adsorbed within the adsorbing material so that humid regenerating air is exhausted into the atmosphere through the shuttle valve 33 and a connection conduit 41. Position signals from a control unit 50 are applied to the shuttle valves 33 and 34 through control signal lines 55 and 57. The position signals effect switching of the drying pots 35 and 36 from drying to regeneration and vice versa. The control unit 50 is caused to supply position signals by control signals received through control signal line 51 or 53 connected to the temperature sensors 52, 54 respectively. The sensing element of the temperature sensor 52 extends into the output conduit 59 of regenerating air at a position between drying pot 36 and output connecting conduit 41 when the shuttle valves 33, 34 assume the position as shown in FIG. 3. The sensing element of temperature sensor 54 extends into the output conduit 58 of regenerating air which is connected to the drying pot 35 and the output connection conduit 41 when the shuttle valves 33 and 34 are switched. The control unit 50 forms a switching signal on anyone of lines 55 and 57 in response to a control signal from the temperature sensor 52 on line 51 which represents temperature TE, only in case the shuttle valves 33, 34 are switched into positions as shown in FIG. 3. The control unit 50 forms a switching signal on lines 55 and 57 in response to a control signal on line 53 representing temperature TE only in case the shuttle valves 33 and 34 are switched into positions not shown in FIG. 3 so that the drying pot 35 is in the regeneration cycle and drying pot 36 is in the adsorption cycle.

Clearly, the sensing elements of temperature sensors 52 and 54 may alternatively be mounted within the molecular sieves in the drying pots 34, 36 proximate to the output conduits 58, 59, respectively. It may be understood that control 50 unit corresponds to control unit 20 but is equipped with an additional logic block (not shown) at the input thereof which allows processing the signals appearing on only one of the lines 51, 53 in relation to the positions of the valves 33, 34.

As explained above the temperature sensor may be mounted within a layer of the adsorbing material which is reached by the hot air during the regeneration cycle as late as possible. Thus, the temperature sensor may be mounted in the adsorption materials substantially opposite to the hot air input. Alternatively, the temperature of a wall of a container for the adsorbing material at the downstreamside thereof may be monitored, thereby indirectly scanning the temperature of the adsorbing material. A very economic mounting of the temperature sensor is obtained by an embodiment wherein the temperature sensor is mounted within the output conduit of the regenerating medium leaving the drying pot, thereby determining the temperature of the regeneration medium flowing out of the drying pot.

EXAMPLE

A drying pot includes adsorbing material in the amount of 10 kg molecular sieve. The exhaust air with a temperature of 50 degrees centigrade coming from a drying hopper filled with plastic granulates, is to be dried. With maximum load an optimum adsorption period lasts for one hour during which 1 kg water is adsorbed. The molecular sieve which can adsorb at most 20% of its weight allows for obtaining under these conditions, i.e. an adsorption of 1 kg water or 10% of its own weight, a dew point of $-30$ degrees centigrade of the dried air which is refed to the drying hopper. Under these conditions it is found, that it takes 11 minutes of regeneration time to reach TE=140 degrees centigrade (see curve 2, FIG. 1).

CONTROL EXAMPLE NO. 1

During regeneration the control unit measures a time of 11 minutes from the beginning of regeneration until TE=140° C. is reached, indicating an optimal water load. The duration of the following adsorption cycle is not changed.

CONTROL EXAMPLE NO. 2

During regeneration the control unit measures a time of 7 minutes from the beginning of regeneration until TE=140° C. is reached (curve 1, FIG. 1), indicating a smaller than optimal water load. The duration of the next adsorption cycle is extended by 10 minutes. This stepwise extension of the duration of succeeding adsorption cycles is continued until it is determined that the time span from the beginning of the regeneration until TE=140° C. has been reached is 11 minutes.

It has been determined empirically that for a water content of the adsorption material of 1 kg during the regeneration cycle, a period of time of approximately 8 minutes had been required for a raise of temperature from TA=60° C. to TE=120° C. In case a shorter period of time for the raise of temperature from TA to TE is determined the succeeding adsorption period is lengthened.

ALTERNATE TO CONTROL EXAMPLES NO. 1 AND 2

When the temperature of the exhaust air raises to 60 degree centigrade it is switched from adsorption to regeneration when the adsorbed quantity of water reaches 0.9 kg which corresponds to a time interval of 10 minutes. When the temperature of the exhaust air rises to 70° C., switching from adsorption to regeneration occurs when the taken up quantity of water reaches 0.75 kg which corresponds to a time interval of 8.5 min.

While the invention has been illustrated and described as embodied in a method and apparatus for adsorbing moisture from gases, especially air, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A method of controlling a duration of an absorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles, said method consisting of monitoring, during a regeneration cycle, a parameter of the adsorbing material depending on a total amount of moisture adsorbed by the adsorbing material during an adsorption cycle immediately preceding the regeneration cycle; comparing the value of the parameter monitored to a predetermined value of the parameter related to an optimum quantity of moisture to be adsorbed by the adsorbing material during adsorption; and controlling the duration of an adsorption cycle immediately succeeding the regeneration cycle according to said comparing.

2. A method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles, said method consisting of monitoring, during a regeneration cycle, only a temperature of the adsorbing material and determining a time interval for the temperature of the adsorbing material to reach a predetermined temperature from an initial temperature; comparing the time interval obtained in the determining step to a predetermined time interval; and controlling the duration of an adsorption cycle immediately succeeding the regeneration cycle according to said comparing.

3. A method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles, said method consisting of monitoring, during a regeneration cycle, only a temperature of the regenerating medium and determining a time interval for the temperature of the regeneration medium to reach a predetermined temperature from an initial temperature; comparing the time interval obtained in the determining step to a predetermined time interval; and controlling the duration of an adsorption cycle immediately succeeding the regeneration cycle according to said comparing.

4. Method as defined in claim 2, wherein the initial temperature is a temperature of the adsorbing material at the start of the regeneration cycle.

5. Method as defined in claim 2, wherein the initial temperature is between a temperature of the adsorbing material at the start of the regeneration cycle and the predetermined temperature.

6. Method as defined in claim 3, wherein the initial temperature is a temperature of the regenerating medium at the start of the regeneration cycle.

7. Method as defined in claim 3, wherein the initial temperature is between a temperature of the regenerating medium at the start of the regeneration cycle and the predetermined temperature.

8. Method as defined in claim 2, wherein said controlling includes setting the duration of the adsorption cycle immediately succeeding the regeneration cycle equal to the duration of the adsorption cycle immediately preceding the regeneration cycle plus a predetermined fixed period if the time interval obtained in the determining step is less than the predetermined time interval.

9. Method as defined in claim 2, wherein said controlling includes setting the duration of the adsorption cycle immediately succeeding the regeneration cycle equal to the duration of the adsorption cycle immediately preceding the regeneration cycle minus a predetermined fixed period if the time interval obtained in the determining step is more than the predetermined time interval.

10. Method as defined in claim 3, wherein said controlling includes setting the duration of the adsorption cycle immediately succeeding the regeneration cycle equal to the duration of the adsorption cycle immediately preceding the regeneration cycle plus a predetermined fixed period if the time interval obtained in the determining step is less than the predetermined time interval.

11. Method as defined in claim 3, wherein said controlling includes setting the duration of the adsorption cycle immediately succeeding the regeneration cycle equal to the duration of the adsorption cycle immediately preceding the regeneration cycle minus a predetermined fixed period if the time interval obtained in the determining step is more than the predetermined time interval.

12. Method as defined in claim 2, wherein said controlling includes controlling the duration of the adsorption cycle immediately succeeding the regeneration cycle according to a temperature of the gas.

13. Method as defined in claim 3, wherein said controlling includes controlling the duration of the adsorption cycle immediately succeeding the regeneration cycle according to a temperature of the gas.

14. A method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles, said method consisting of monitoring, during an adsorption cycle, a dew point of a dried gas generated during the adsorption cycle from the moisture-carrying gas by passage of the moisture-carrying gas through the adsorbing material; comparing the dew point obtained during the monitoring with a preset dew point; and controlling the duration of the adsorption cycle immediately succeeding the regeneration cycle according to said comparing so that successive dew points of the dried gas generated during successive subsequent adsorption cycles rise in response to rising temperatures in the moisture-carrying gas and fall in response to falling temperatures in the moisture-carrying gas.

15. An apparatus for adsorbing moisture from gases, particularly air, comprising an exhaust air drier including at least one drying pot containing an adsorbing material; an exhaust conduit connected to the at least one drying pot for feeding a moisture-carrying gas to the at least one drying pot; an input conduit connected to the at least one drying pot for feeding a hot regenerating medium to the at least one drying pot; an outlet conduit connected to the at least one drying pot for the regenerating medium; a temperature sensor located in the output conduit for the regenerating medium to sense a temperature of the regenerating medium and to generate an output signal according to the temperature of the regenerating medium; and control means for receiving the output signal of the temperature sensor and controlling a duration of an adsorption cycle of a plurality of successive alternating adsorption and regeneration cycles according to a measured time interval for a predetermined temperature increase of the regeneration medium in an immediately preceding regeneration cycle.

16. An apparatus for adsorbing moisture from gases, particularly air, comprising an exhaust air drier including at least one drying pot containing an adsorbing material; an exhaust conduit connected to the at least one drying pot for feeding a moisture-carrying gas to the at least one drying pot; an input conduit connected to the at least one drying pot for feeding a hot regenerating medium to the at least one drying pot; an outlet conduit connected to the at least one drying pot for the regenerating medium; a temperature sensor extending into the adsorbing material in the drying pot to sense a temperature of the adsorbing material and to generate an output signal according to the temperature of the adsorbing material; and control means for receiving the output signal from the temperature sensor and controlling a duration of an adsorption cycle of a plurality of successive alternating adsorption and regeneration cycles according to a measured time interval for a predetermined temperature increase of the adsorbing material in an immediately preceding regeneration cycle.

17. An apparatus as defined in claim 16, wherein said control means includes a counter, means for starting said counter when said temperature sensor reaches an initial temperature, means for turning off said counter when said temperature sensor reaches a predetermined temperature greater than said initial temperature; memory means connected to said counter and said means for starting and said means for turning off, said memory means containing a plurality of storage locations for receiving and storing a plurality of successive total counts of said counter and also said predetermined temperature and said initial temperature, each of said total counts of said counter corresponding to the count of said counter when said means for turning off said counter turns off said counter during one of said regeneration cycles; comparator means for comparing a current total count of said counter with an immediately preceeding total count of said counter, said comparator means being connected with said memory means; and three timing means connected with said comparator means, each of said timing means producing a first switching signal for switching said drying pot from one of the regeneration cycles to the immediately following adsorption cycle and a second switching signal for switching said drying pot from the immediately following adsorption cycle to the next following regeneration cycle, a time interval between said first and second switching signals of said second switching means being always greater than a corresponding time interval of said first switching means and less than a corresponding time interval of said third switching means, said comparator means being connected to said timing means so that when said current count of said counter is equal to said immediately preceeding count said second timing means is activated and said first and third timing means are deactivated and when said curent count of said counter is greater than said immediately preceeding count said first timing means is activated and said second and third timing means are deactivated.

18. An apparatus for adsorbing moisture from gases, particularly air, comprising an exhaust air drier including at least one drying pot containing an adsorbing material; an exhaust conduit connected to the at least one drying pot for feeding a moisture-carrying gas to the at least one drying pot; an input conduit connected to the at least one drying pot for feeding a hot regenerating medium to the at least one drying pot; an outlet conduit connected to the at least one drying pot for the regenerating medium; a temperature sensor extending into the adsorbing material in the drying pot to sense the temperature of the adsorbing material and to generate an output signal according to the temperature of the adsorbing material; and control means for receiving the output signal from the temperature sensor and controlling a duration of an adsorption cycle of a plurality of successive alternating adsorption and regeneration cycles according to a measured time interval for a predetermined temperature increase in an immediately preceding regeneration cycle, said control means including a counter, means for starting said counter when said temperature sensor reaches an initial temperature, means for turning off said counter when said temperature sensor reaches a predetermined temperature greater than said initial temperature; memory means connected to said counter and said means for starting and said means for turning off, said memory means containing a plurality of storage locations for receiving and storing a plurality of successive total counts of said counter and also said predetermined temperature and said initial temperature, each of said total counts of said counter corresponding to the count of said counter when said means for turning off said counter turns off said counter during one of said regeneration cycles; comparator means for comparing a current total count of said counter with an immediately preceding total count of said counter, said comparator means being connected with said memory means; and three timing means connected with said comparator means, each of said timing means producing a first switching signal for switching said drying pot from one of the regeneration cycles to the immediately following adsorption cycle and a second switching signal for switching said drying pot from the immediately following adsorption cycle to the next following regeneration cycle, a time interval between said first and second switching signals of said second switching means being always greater than a corresponding time interval of said first switching means and less than a corresponding time interval of said third switching means, said comparator means being connected to said timing means so that when said current count of said counter is equal to said immediately preceding count said second timing means is activated and said first and third timing means are deactivated and when said current count of said counter is greater than said immediately preceding count said first timing means is activated and said second and third timing means are deactivated.

* * * * *